(12) United States Patent
Baughman et al.

(10) Patent No.: US 12,263,494 B2
(45) Date of Patent: Apr. 1, 2025

(54) VALVE AND GASKET TOLERANT TO PRESSURE-DIFFERENTIALS

(71) Applicant: RIEKE LLC, Auburn, IN (US)

(72) Inventors: Gary Baughman, Auburn, IN (US); Thomas Kasting, Auburn, IN (US)

(73) Assignee: RIEKE LLC, Auburn, IN (US)

( * ) Notice: Subject to any disclaimer, the term of this patent is extended or adjusted under 35 U.S.C. 154(b) by 0 days.

(21) Appl. No.: 17/642,308

(22) PCT Filed: Sep. 14, 2020

(86) PCT No.: PCT/US2020/050673
§ 371 (c)(1),
(2) Date: Mar. 11, 2022

(87) PCT Pub. No.: WO2021/051058
PCT Pub. Date: Mar. 18, 2021

(65) Prior Publication Data
US 2022/0339651 A1   Oct. 27, 2022

Related U.S. Application Data

(60) Provisional application No. 62/899,851, filed on Sep. 13, 2019.

(51) Int. Cl.
*B05B 11/00* (2023.01)
*B05B 7/00* (2006.01)
*B05B 11/10* (2023.01)

(52) U.S. Cl.
CPC ...... *B05B 11/00442* (2018.08); *B05B 7/0018* (2013.01); *B05B 11/1087* (2023.01)

(58) Field of Classification Search
CPC ............ B05B 11/00442; B05B 7/0018; B05B 11/1087; B05B 7/0025; B05B 11/0032
See application file for complete search history.

(56) References Cited

U.S. PATENT DOCUMENTS

| | | |
|---|---|---|
| 3,451,596 A | 6/1969 | Marand |
| 3,556,357 A | 1/1971 | Taylor |
| 3,828,973 A | 8/1974 | Birrell |
| 3,960,298 A | 6/1976 | Birrell |
| 4,946,080 A | 8/1990 | Vesborg |
| 5,950,879 A | 9/1999 | Ritsche |

(Continued)

FOREIGN PATENT DOCUMENTS

| | | |
|---|---|---|
| AU | 6809165 A | 6/1967 |
| DE | 1009871 B | 6/1957 |

(Continued)

OTHER PUBLICATIONS

Patent Cooperation Treaty (PCT), International Search Report and Written Opinion for Application PCT/US2020/050673 filed on Sep. 14, 2020 dated Dec. 16, 2020, International Searching Authority, US.

(Continued)

*Primary Examiner* — Vishal Pancholi
(74) *Attorney, Agent, or Firm* — McDonald Hopkins LLC

(57) ABSTRACT

A valve for a dispenser pump is carried on a circular post or tube of a pump body. A protruding, sealing flange is formed at one end, while the opposing end includes tapering ribs extend along the inner surface of the hollow, tubular valve. In function, the ribs facilitate the passage of make-up air between the inner surface and the post/tube.

21 Claims, 4 Drawing Sheets

(56) References Cited

U.S. PATENT DOCUMENTS

| | | |
|---|---|---|
| 6,612,468 B2 | 9/2003 | Pritchett et al. |
| 7,748,576 B2 | 7/2010 | Tseng |
| 8,360,282 B2 | 1/2013 | Van De Heijden |
| 9,962,723 B2 | 5/2018 | Baughman |
| 11,167,911 B2 | 3/2021 | Tecchiolli |
| 2003/0222089 A1 | 12/2003 | Hale |
| 2009/0255957 A1 | 10/2009 | Mizushima et al. |
| 2017/0020348 A1 | 1/2017 | Schalitz et al. |
| 2017/0029202 A1 | 2/2017 | Joly |
| 2019/0062034 A1 | 2/2019 | Muhlemann |

FOREIGN PATENT DOCUMENTS

| | | |
|---|---|---|
| EP | 0289854 A2 | 11/1988 |
| EP | 3789316 A | 3/2021 |
| GB | 1241195 A | 7/1971 |
| GB | 1429466 A | 3/1976 |
| JP | 4232174 B2 | 3/2009 |
| JP | 2013177184 A | 9/2013 |
| WO | 2019139890 | 7/2019 |

OTHER PUBLICATIONS

First Office Action in CN202080079192.3, mailed Mar. 4, 2023, 13 pages.

Extended European Search Report mailed Oct. 25, 2023; European Patent Application No. 20863713.2 filed Mar. 22, 2022.

VALVE AND GASKET TOLERANT TO PRESSURE-DIFFERENTIALS

REFERENCE TO RELATED APPLICATIONS

This application is a 35 U.S.C. § 371 national stage application of PCT Application No. PCT/US2020/050673 filed on Sep. 14, 2020, entitled "VALVE AND GASKET TOLERANT TO PRESSURE-DIFFERENTIALS," which claims priority to U.S. Provisional Patent Application Ser. No. 62/899,851 filed on Sep. 13, 2019 each of which are incorporated by reference herein.

TECHNICAL FIELD AND BACKGROUND

This disclosure relates generally to pump dispensers having a valve positioned within the pump engine and proximate to the fluid outflow path. This sleeve-shaped valve admits make up air back into the container which stores the fluid to be dispensed.

Many pump arrangements require the selective passage of air through the pump engine. As used herein, a pump engine includes the pump chamber and various components necessary for drawing fluid from the container and then propelling that fluid out of the dispenser outlet/nozzle. The pump engine often includes an axially aligned hollow tube, with other components coaxially fitted around or within this structure.

One style of valve that finds use in some pump engines is a hollow cylindrical body, provided with a sleeve-like fit around the fluid tube, usually with a radially protruding flap that may be temporarily displaced to allow fluids (e.g., air and/or liquid) to pass around the outer surface of the sleeve-body.

The air passing through the pump engine may be mixed with liquid to produce foam. Other arrangements also require make-up air to pass into the container so as reduce or eliminate negative pressure build-up within the container. Still further styles require both of these functions.

FIG. 1 generically illustrates a dispensing pump relying upon such a valve structure. Dispenser 10 includes a cap 20 positioned over the closure 30 and dispenser nozzle 40. When the cap is removed, air inlets 35 formed permit make-up air to re-enter the container (not shown) after a squeezing action. In particular, liquid from the container is urged past the valve 42 by way of inner flaps 43 deflecting upward. The liquid then enters the foaming chamber 46 and is urged out of the nozzle outlet 48. The resilient sidewalls of the container (not shown) expand, drawing the outer flaps 44 downward and allowing air to pass back into the container's interior.

In these designs, the valve includes resilient, deformable flaps or radially presenting surfaces are temporarily displaced to permit the temporary flow of air or liquid. As shown in FIG. 1, these flaps attach to an annular upstanding wall so that the flaps effectively possess rigidity and hoop strength. In fact, the upstanding wall is in the form of an circular cylinder that defines a fluidic barrier with the nozzle structure 40, so that the liquid/foam outlet (as defined by chamber 46 and outlet 48) remains separated from the air inlets 35. In this manner, the flaps 43, 44 attach on opposing sides of the wall at a midpoint so as to allow each flap 43 or 44 to flex and deform. While this hoop strength ensures a good seal, it also creates significant force which must be overcome to activate the squeeze foamer.

Specific designs for foaming dispensers can be found in U.S. Pat. Nos. 6,612,468 and/or 8,360,282, where flap-style valves allow air to be admitted into the container to facilitate the creation of foam. Similarly, U.S. Pat. No. 7,748,576; U.S. Pat. No. 9,962,723; United States publication 2017/0020348; and international publication WO2019139890 all show other iterations of resilient annular valves for dispenser pumps. In all cases, as noted above, these pump designs rely on valves to admit air for creation of foam while, in some cases, providing for return air to pass back into the container along a peripheral flow path. The description and drawings in each of these references is incorporated as part of this disclosure for background purposes.

These valves are usually employed in pumps where little to no pressure differential can be tolerated between the ambient environment and the interior of the container. Notably, pressure differentials—and particularly negative pressure build up—occurs when fluid is evacuated from a container without the chance for a make up fluid (usually air) to enter the container. In these scenarios, the container must be sufficiently rigid to withstand the pressure differential, or it can be designed to collapse or shrink so that the volume on the inside of the container is reduced.

Rigid containers made from specific types of material (e.g., glass bottles) have disadvantages. Conversely, collapsible containers lack structural strength, giving rise to bursts or leakage while also presenting challenges in terms of shipping and storage (owing to their deformable nature).

An improved valve for use in dispenser pumps requiring a radial flap that was also able to admit air back into the container so as to avoid negative pressure build up therein would be welcome. Such a valve would provide pump dispenser designer with a broader range of options with respect to the physical characteristics of the container to which the pump dispenser is coupled.

SUMMARY OF INVENTION

A sleeve-style valve is designed for incorporation in a dispenser pump. The valve is fitted around a circular post or tube in the pump body (i.e., the components that allow fluid to be transported therethrough, although the exact operation of the engine is immaterial so long as such a surface is presented on which the inventive valve can reside). At one end, a sealing flange protrudes radially away from the axis of the sleeve beyond its outer surface. At the opposing end, tapering ribs extend along the inner surface of the sleeve and terminate in a second flange, although the outer surface is smooth and uninterrupted at this end. In function, the ribs facilitate the passage of make-up air between the inner surface and the post/tube.

BRIEF DESCRIPTION OF THE DRAWINGS

FIG. 2A is a top plan view of the gasket valve, with the wider end having the radial flange facing upward, while

Figure 1:
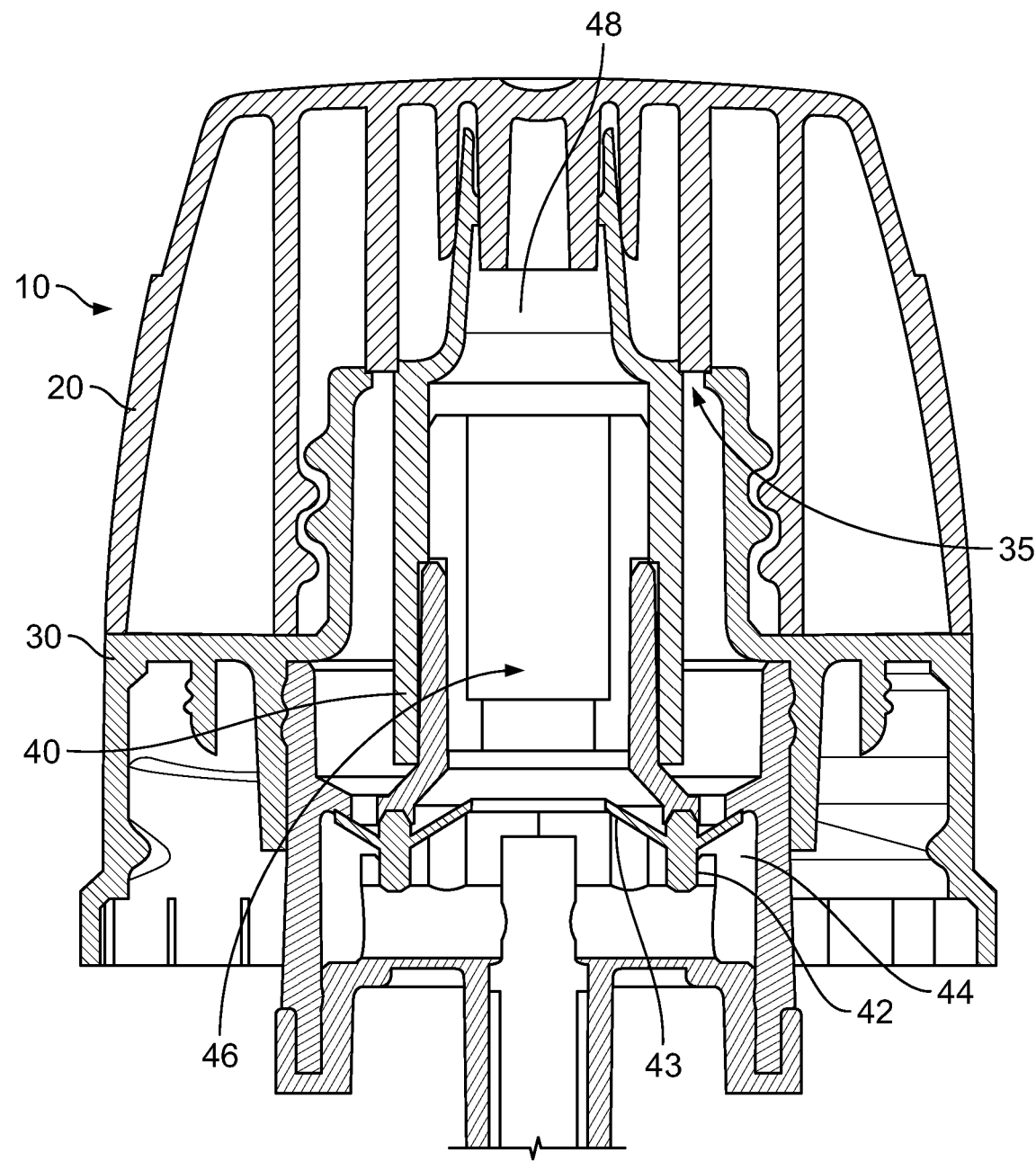
FIG. 1 is a cross sectional view of pump engine including a valve for controlling the admission/passage of air therethrough.
Figure 2B:
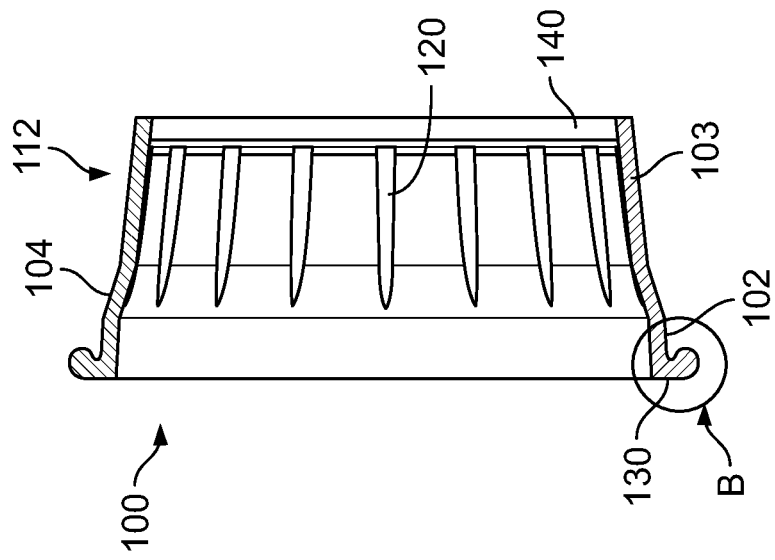
FIG. 2B is a cross sectional side view taken along line A-A.
Figure 2A:
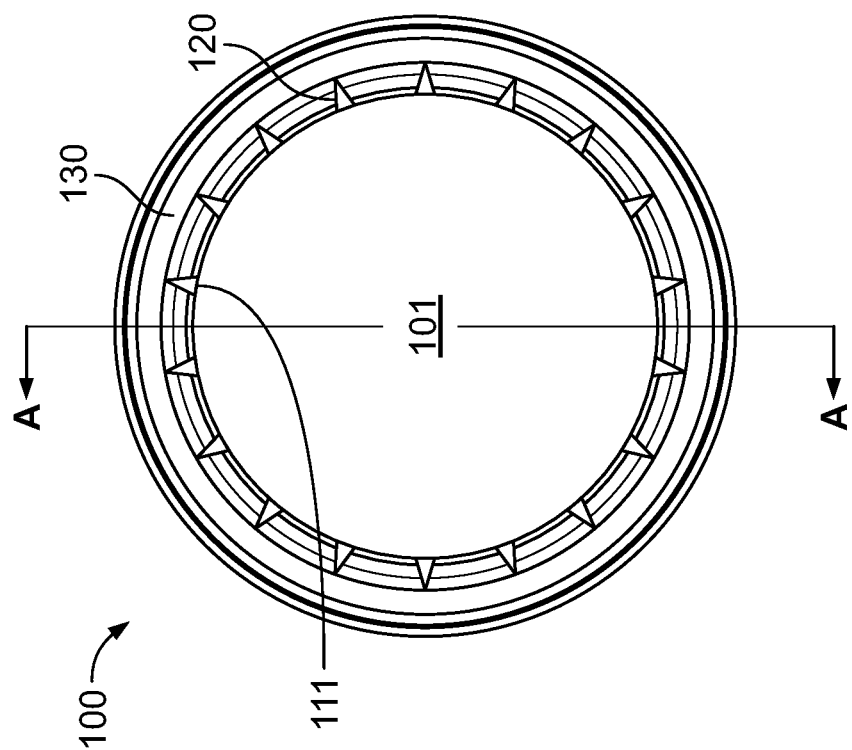
Figure 4:
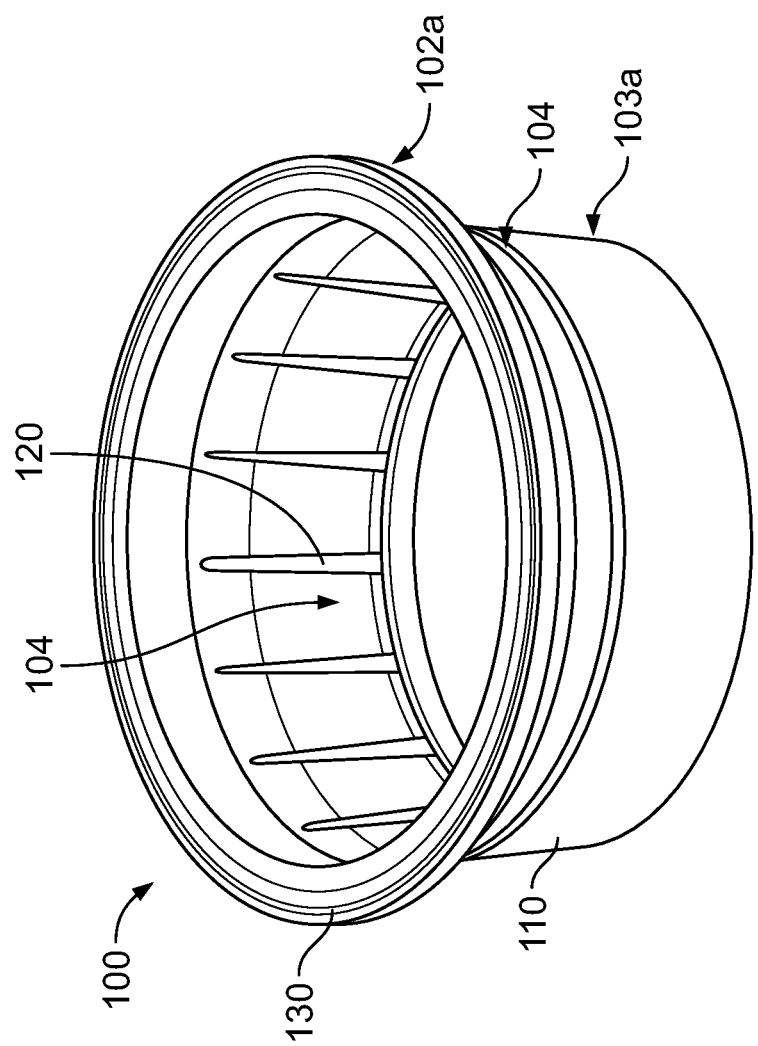
FIG. 4 is a three dimensional view of the gasket valve of FIG. 2A.
Figure 3:
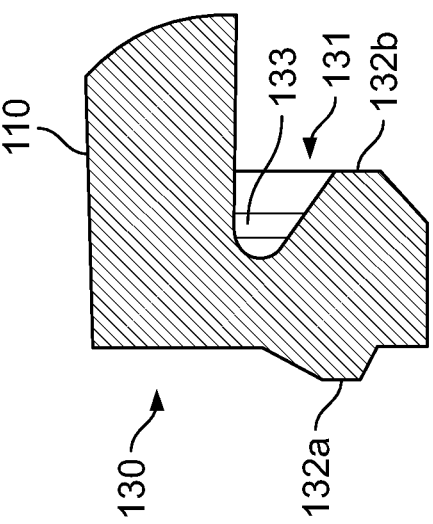
FIG. 3 is an exploded cross sectional detail view of one portion of the radial flange connected to the tubular wall of the main cylinder comprising the gasket valve, as indicated in callout B in FIG. 2A and callout 2 in FIG. 5.

The drawings referenced above show various embodiments of the invention. Any written matter, as well as dimensions and relative ratios or sizes that can be discerned or calculated from these drawings, is incorporated as written material herein. Notably, the components and arrangements individually illustrated in FIGS. 2A through 4 are drawn to scale in each of those Figures.

DESCRIPTION

The inventors realized it may be advantageous to construct a valve where make-up air can pass along the inner surface of the sleeve when a predetermined pressure differential is achieved. This valve may be formed as a hollow, frusto-conical tube, with one end having a wider inner diameter than the other. A flap or outward radial protrusion may be provided at this wider end to position the valve within the pump engine, as well as to allow separate, selective fluid flow around the outer portion thereof.

At the wider end of the valve, a radial flange extends in a generally orthogonal direction relative to the tubular/conical portion of the valve. The top facing of this flange creates a sealing face with a separate part of the pump. On the underside of the flange, a sealing face is created with the container.

A sealing face is created along the inner diameter of the narrow end. As such, it may include an annular bead to position, engage, and seal with a facing of the pump engine. Ribs are spaced apart and axially aligned along the inner surface of the valve. These ribs gradually increase in wall thickness as they approach the edge of the narrow end, where a portion of increased thickness extends inwardly from the sleeve to effectively define an inner facing band or flange. The wall thickness defined by each rib may approach or match the wall thickness of inner facing band at their juncture.

In some aspects, the individual ribs may also present with an elongated triangle shape, so as to have increasing arcuate width (i.e., in the radial direction) as each rib approaches the narrow end. Also, the ribs are spaced apart—preferably evenly—along the inner surface. This arrangement provides a small radial pocket between the sleeve valve and the tubular post on which it resides through which air may pass if/when sufficient pressure differential is achieved.

Also, the wide end of the valve has a larger outer diameter (whether measured from the radial edge of the flap or from the smooth outer wall surface immediately beneath that flap), along with an inner diameter. In turn, the inner diameter at the inner facing band of the narrow end is less than the inner diameter at the wide end, so as to impart a frusto-conical shape to the overall valve. However, the ribs (and radial pockets associated therewith) are matched with a material that is sufficient resilient to allow temporary, outward deformation in this narrow end of the valve.

This arrangement allows fluid from the container to come into contact with—or even press up against—the outer surface of the valve along the tubular/conical sidewalls. Conversely, atmospheric air comes into contact with the outer facing of the radial flange, as well as portions of the inner surface of the tubular section, as will be described in more detail below (as well as illustrated in FIGS. 1-4). Thus, the ambient environment exerts pressure along the inner surface of the wide end of the valve, while narrow end is designed to seal the inner surface to the pump engine so as to only permit ambient air along the inner surface when sufficient pressure differential is achieved.

In this manner, air can "burp" back into the container at negative pressure differentials without leakage which might otherwise occur if venting occurred at lower pressure differentials. In one preferred aspect, the pressure differential is designed to be between 100 and 350 millibars (~0.1 to ~0.35 atm) This compares against >500 millibars (0.5 atm) for a smooth flanged valve not possessing the inner-facing ribs, gasket, and beaded seal features. At that high of a differential, the container must possess either a separate vent and/or sufficient rigidity to avoid structural collapse and potential failure.

In another aspect, the pressure differential experienced between the narrow end of the valve and the interior of the container itself may be less one third, less than one fifth, or between one third and one fifth of the (negative) pressure in the container itself, with the ambient atmospheric pressure being exerted on the wide end.

In terms of functioning, the inner-facing ribs form/allow for an air pocket that admits atmospheric air into the container but more importantly provides surface area for external (outside the bottle) air to act upon the valve to open it sufficiently by pushing valve outwardly as internal pressure drops and external pressure overcome the material's preloaded tensile modulus stresses applied at the sealing band area. Ambient air passes through the body's hole into tubular inner section of the valve so that valve's inside surfaces now communicates with the ambient atmosphere. Without the radial pockets created by the ribs, the air could not act upon the valve area as effectively and allow sufficient preload to seal as needed.

Notably, liquid still accumulates around the outer cone/surface of the valve. This liquid squeezes the valve inwardly but do not eliminate the air pockets out from between the ribs. When sufficient pressure differential exists between the ambient atmosphere (at the wide end) and interior of the container (at the narrow end), air is forced through the valve's annular flange gasket seal at the narrow end and into the inner volume of the container. Meanwhile, beads formed on the annular flange at the wide end of the valve create a sealing face against the container mouth and the pump engine.

While various aspects of the inventions are mentioned above, specific combination of the following features for vacuum-tolerate gasket-valve seal member are specifically embraced by the invention:

- a hollow cylinder having a wider end, a narrower end, and a tubular wall connecting the wider end to the narrower end;
- wherein an inner cylinder diameter at the wider end is larger than an outer cylinder diameter at the narrower end;
- an outer radial flange attached to an outer facing of the tubular wall at a terminal edge of the wider end and disposed concentrically outward in a plane parallel with the inner cylinder diameter;
- an inner radial flange attached to an inner facing of the tubular wall at a terminal edge of the narrower end and disposed to project radially inward in a plane parallel with the outer cylinder diameter;
- a plurality of support ribs formed contiguously with the inner radial flange and extending upward toward the wider end along the inner facing of the tubular wall;
- wherein the support ribs are identically shaped and evenly spaced around a circumference of the inner facing;

wherein each support rib extends radially inward to form a wall thickness that: (i) progressively increases as each support rib approaches the inner radial flange; and (ii) is less than or equal to a wall thickness of the inner radial flange;
wherein the wall thickness of each support rib is identical;
wherein the wall thickness of each support rib is gradually reduced as the rib extends axially upward and away from the inner radial flange;
wherein each support rib has a generally triangular shape along the inner facing of the tubular wall with a wide base of the triangular shape abutting the inner radial flange and a pointed apex terminating between the narrower end and the wider end;
wherein at least eight support ribs are provided;
wherein eighteen support ribs are provided;
wherein no more than forty support ribs are provided;
wherein the tubular wall has a first section proximate to the wider end and a second section proximate to the narrower end;
wherein the first section is formed as a substantially circular cylinder;
wherein the second section has a frusto-conical shape;
wherein at least one support rib tapers into the inner facing of the tubular wall in the second section;
wherein each support rib tapers into the inner facing of the tubular wall proximate to a transition point joining the first section and the second section;
wherein each support rib forms a generally triangular shape along the inner facing of the tubular wall with a wide base of the triangular shape abutting the inner radial flange and a pointed apex terminating on the second section;
wherein a thickness of the tubular wall is greater in the first section than a thickness of the tubular wall in the second section;
wherein the outer radial flange has an axially extending portion defining a axially oriented annular gap between the outer radial flange and the outer facing of the first section;
wherein the outer radial flange has a bulbous shape;
wherein an annular bead is formed on the axially extending portion projects radially into the axially oriented annular gap;
wherein two annular beads are disposed on radially opposing edges of the outer radial flange;
wherein a length of the axially extending portion is substantially identical to a width of the axially extending portion;
wherein the outer radial flange includes at least one annular bead;
wherein the annular bead extends radially outward on an outer surface of the outer radial flange;
wherein the annular bead projects radially inward toward the outer facing of the tubular wall;
wherein annular bead defines a radial gap between the annular bead and a facing of the outer radial flange closest to the narrower end;
wherein a thickness of the tubular wall is gradually reduced from a thickest point proximate to the wider end to a thinnest point proximate to the narrower end;
wherein an axial length between the wider end and the narrower end is less than the outer cylinder diameter;
wherein a maximum inner cylinder diameter is at least twice as large as the axial length;
wherein a maximum inner cylinder diameter is greater than 90% of the outer cylinder diameter;
wherein a maximum inner cylinder diameter is between 88% to 98% of the outer cylinder diameter;
wherein the gasket-valve consists essentially of a resilient material;
wherein the gasket-valve comprises a thermoplastic elastomer;
wherein the gasket-valve comprises of an olefinic material; and
wherein the gasket-valve consists of a single material.

Turning to the drawings, FIGS. 2A through 4 highlight various aspects of the invention. Valve 100 is a hollow tube or cylinder, having a circular cross sectional shape. Sidewalls 110 generally enclose a central aperture 101. The sidewalls 110 impart a frusto-conical shape to the tube/cylinder, with a wide end 102 and a narrow end 103. When installed, a post or tubular structure of the pump engine (not shown) is coaxially received in aperture 101 so that the inner surface 111 of the valve 100 creates a sealing face therewith. As will be discussed below, the outer surface 112 may come into contact with and/or seal the container wall (e.g., along the container neck or opening).

A radially (or outwardly) extending flange 130 is positioned at the terminal edge of the wide end 102. As mentioned above, and as may be dictated by the exigencies of the pump engine into which valve 100 is deployed, flange 130 is positioned proximate an opening in the dispenser that connects to the ambient atmosphere. The cross sectional shape of the flange 130 may be bulbous, so as to include bulges or beaded sections 132a, 132b, and/or 133. Preferably, beads 132a and 132b are formed on opposing facings of the flange 130. Bead 133 projects into an annular gap defined by the flange 130 and side wall 110. It has been found these shapes/formations facilitate seating and retention of the valve 100 in certain types of pump engines.

A inner facing flange 140 is positioned at the terminal edge of the narrow end 103. Here, the flange 140 has the same or thicker cross section in comparison to the sidewall 110 to which it adjoins. Notably, the outer surface 112 in the narrow end 103 is smooth. Ribs 120 may be formed flush with or slightly inset from the inner diameter of the flange 140, although the thickness and width of these ribs 120 diminishes as the ribs extend upward toward end 102 so as to eventually blend into the smooth surface of inner facing 111.

As noted above, the valve 100 may have a frusto-conical shape that is further divided into a substantially straight-walled cylinder portion 102a. This portion 102a has a comparatively thicker wall than frusto-conical portion 103a. Transition section 104 joins portions 102a and 103a.

A plurality of ribs 120 (at least 8, preferably 18, and no more than 40) are formed on the inner facing 111 of the valve 100. In some embodiments, this ribs have a tapered triangular shape, so that the thickest and widest part abuts the flange 140. The ribs 120 are spaced apart, preferably at regular circumferential positions so as to define radial pockets 104 as described above. Still other comparative and salient features of the dimensions and spacing of the ribs, as well as the comparative positioning and size of the sections noted above are provided in the bullet point list above.

The material composition of the valve 100 is preferably made from a single material, such an olefin or thermoplastic elastomer. In any event, the composition should be resilient and capable of repeatedly and predictably deforming, so as to permit the admission of air along the inner facing 111. Conversely, flange 130 should be structurally sufficient to engage the container and withstand the forces associated therewith.

Figure 5:
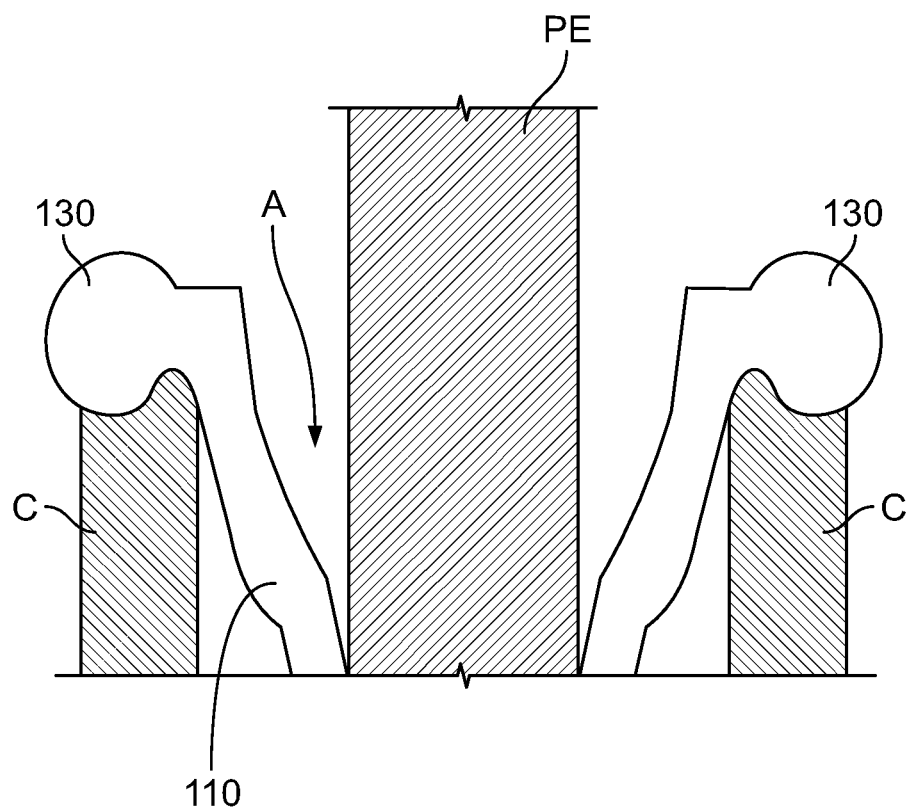
FIG. 5 is a an exploded cross sectional detail of one portion of the gasket valve of FIG. 2A as it might be positioned within/between a pump and container arrangement, including an arrow indicating the flow of make up air back into the container so as to mitigate build up of negative pressure within the interior of the container.

FIG. 5 shows a schematic representation of the top/wide end of the valve as it might be received in pump engine PE and container C. Specifically, flange 130 engages and seals to container C, while side wall 110 engages with a sleeve-like fit to seal to the pump engine PE. The wider end proximate flange 130 allows for air to flow into the valve 100 from the ambient atmosphere, generally following path A. when sufficient pressure differential exists (both from the atmosphere and from the negative pressure environment in the sealed container), air is drawn into the pockets 104 and, eventually, pulled past the flange 140 into the container. In this manner, unnecessarily large pressure differentials are avoided so that greater flexibility in the design and selection of materials for the container can be achieved.

The foregoing claims highlight still other features contemplated in certain embodiments. As such, that section is also incorporated into this disclosure and further informs the drawings.

We claim:

1. A vacuum-tolerate gasket-valve seal member comprising:
    a hollow cylinder having a wider end, a narrower end, and a tubular wall connecting the wider end to the narrower end;
    an outer radial flange attached to an outer facing of the tubular wall at a terminal edge of the wider end and disposed concentrically outward in a plane parallel with an inner cylinder diameter;
    an inner radial flange attached to an inner facing of the tubular wall at a terminal edge of the narrower end and disposed to project radially inward in a plane parallel with an outer cylinder diameter so that diametrically opposed inner, axially-aligned facings of the inner radial flange define a central aperture at the terminal edge of the narrower end; and
    a plurality of support ribs formed contiguously with the inner radial flange and extending upward toward the wider end along the inner facing of the tubular wall and wherein at least support one rib is formed flush with a portion of the inner, axially-aligned facings;
    wherein the hollow cylinder, the outer radial flange, the inner radial flange, and the plurality of support ribs are all integrally formed from a resilient, deformable olefin or thermoplastic elastomer material; and
    wherein the inner cylinder diameter at the wider end is larger than the outer cylinder diameter at the narrower end.

2. The gasket-valve seal member of claim 1 wherein the support ribs are identically shaped and evenly spaced around a circumference of the inner facing.

3. The gasket-valve seal member of claim 2 wherein the height of each support rib is gradually reduced so that each support rib tapers into the inner facing of the tubular wall.

4. The gasket-valve seal member of claim 1 wherein each support rib forms a generally triangular shape along the inner facing of the tubular wall with a wide base of the triangular shape abutting the inner radial flange and a pointed apex terminating between the narrower end and the wider end.

5. The gasket-valve seal member of claim 1 wherein at least eight support and no more than forty support ribs are provided.

6. The gasket-valve seal member of claim 1 wherein eighteen support ribs are provided.

7. The gasket-valve seal member of claim 1 wherein the tubular wall has a first section proximate to the wider end and a second section proximate to the narrower end.

8. The gasket-valve seal member of claim 7 wherein the first section is formed as a substantially circular cylinder.

9. The gasket-valve seal member of claim 8 wherein the second section has a frusto-conical shape.

10. The gasket-valve seal member of claim 9 wherein at least one support rib tapers into the inner facing of the tubular wall in the second section.

11. The gasket-valve seal member of claim 9 wherein each support rib tapers into the inner facing of the tubular wall proximate to a transition section joining the first section and the second section.

12. The gasket-valve seal member of claim 1 wherein each support rib forms a generally triangular shape along the inner facing of the tubular wall with a wide base of the triangular shape abutting the inner radial flange and a pointed apex terminating on the second section.

13. The gasket-valve seal member of claim 7 wherein a thickness of the tubular wall is greater in the first section than a thickness of the tubular wall in the second section.

14. The gasket-valve seal member of claim 1 wherein the outer radial flange has an axially extending portion defining a axially oriented annular gap between the outer radial flange and the outer facing of the first section.

15. The gasket-valve seal member of claim 14 wherein an annular bead formed on the axially extending portion projects radially into the axially oriented annular gap.

16. The gasket-valve seal member of claim 14 wherein two annular beads are disposed on radially opposing edges of the outer radial flange.

17. The gasket-valve seal member of claim 1 wherein the outer radial flange includes at least one annular bead.

18. The gasket-valve seal member of claim 17 wherein the annular bead extends radially outward on an outer surface of the outer radial flange.

19. The gasket-valve seal member of claim 1 wherein a thickness of the tubular wall is gradually reduced from a thickest point proximate to the wider end to a thinnest point proximate to the narrower end.

20. The gasket-valve seal member of claim 19 wherein an axial length between the wider end and the narrower end is less than the outer cylinder diameter.

21. The gasket-valve seal member of claim 1 wherein the inner cylinder diameter at the narrow end is between 88% to 98% of the outer cylinder diameter at a tubular wall section immediately beneath the outer radial flange.

* * * * *